(12) United States Patent
Chen

(10) Patent No.: US 6,928,080 B2
(45) Date of Patent: Aug. 9, 2005

(54) TRANSPORTING VARIABLE LENGTH ATM AAL CPS PACKETS OVER A NON-ATM-SPECIFIC BUS

(75) Inventor: Allen Peilen Chen, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 952 days.

(21) Appl. No.: 09/896,091

(22) Filed: Jun. 28, 2001

(65) Prior Publication Data

US 2003/0002538 A1 Jan. 2, 2003

(51) Int. Cl.$^7$ .............................................. H04L 12/28
(52) U.S. Cl. ................................. 370/395.6; 370/509
(58) Field of Search ............................ 370/389, 395.1, 370/395.6, 395.61, 395.63, 395.64, 395.65, 474, 476, 503, 509

(56) References Cited

U.S. PATENT DOCUMENTS

| | | | |
|---|---|---|---|
| 5,742,765 A | | 4/1998 | Wong et al. |
| 5,802,287 A | | 9/1998 | Rostoker et al. |
| 6,075,798 A | * | 6/2000 | Lyons et al. ................ 370/474 |
| 6,118,763 A | | 9/2000 | Trumbull |
| 6,574,226 B1 | * | 6/2003 | Nakano et al. ......... 370/395.64 |
| 6,590,909 B1 | * | 7/2003 | Stacey et al. ............... 370/537 |
| 6,594,267 B1 | * | 7/2003 | Dempo ................... 370/395.64 |
| 6,621,821 B1 | * | 9/2003 | Song ....................... 370/395.6 |
| 6,625,171 B1 | * | 9/2003 | Matsudo ................... 370/470 |
| 6,711,126 B1 | * | 3/2004 | Besset-Bathias ............ 370/229 |
| 6,747,977 B1 | * | 6/2004 | Smith et al. ........... 370/395.64 |
| 2002/0067695 A1 | * | 6/2002 | Skarpness et al. ....... 370/230.1 |
| 2004/0213204 A1 | * | 10/2004 | Yang .......................... 370/352 |

OTHER PUBLICATIONS

David E. McDysan, Darren L. Spohn; Chapter 13: *ATM Adaptation Layers*, pp. 345–371; 1998; ATM Theory and Application Signature Edition.

David E. McDysan, Darren L. Spohn; Chapter 16: *ATM Hardware and Switching*, pp. 447–476; 1998; ATM Theory and Application Signature Edition.

David E. McDysan, Darren L. Spohn; Chapter 17: *ATM Interworking with Voice and Video*, pp. 477–491; 1998; ATM Theory and Application Signature Edition.

Said Soulhi; *Telephony over packet networks* pp. 4–8; 1999; IEEE Canadian Review—Winter / Hiver.

Maker Communications, Inc.; *MXT3010 High–Performance Cell Processor*; 1998; Maker Communications, Inc.

Maker Communications, Inc.; *MXT3020 Circuit Coprocessor for ATM*; Maker Communications, Inc.

RadiSys.; *C6X Solutions For A Voice Over IP Gateway*.

Juan Noguera, Ericsson Nippon, JAPAN; *ATM Adaptation Layer 2*; Spring 1998; http://computer.org/students/looking/spring1998/noguera/aal2.html.

* cited by examiner

*Primary Examiner*—Bob A. Phunkulh
(74) *Attorney, Agent, or Firm*—Fish & Richardson, P.C.

(57) ABSTRACT

Transporting a variable length AAL CPS packet over a non-ATM-specific bus includes determining a variable length AAL CPS packet and transmitting the variable length AAL CPS packet over a non-ATM-specific bus. A first part of the variable length AAL CPS packet is received and a length of the variable length AAL CPS packet is determined and then used to determine synchronization information. Reception of the variable length AAL CPS packet continues, and the synchronization information is used to determine that reception of the variable length AAL CPS packet is complete.

30 Claims, 14 Drawing Sheets

| Higher Layers |
|---|
| ATM Adaptation Layers (AALs) |
| ATM Layer |
| Physical Layer |

*FIG. 1*

TRANSPORTING VARIABLE LENGTH ATM AAL CPS PACKETS OVER A NON-ATM-SPECIFIC BUS

TECHNICAL FIELD

This invention relates to transporting variable length ATM AAL CPS packets.

BACKGROUND

Asynchronous transfer mode (ATM) is an asynchronous, high bandwidth, low latency, cell-based switching and multiplexing technology. ATM is designed to provide a general-purpose, connection-oriented transfer mode for a wide range of services. To provide connection-oriented service, ATM employs the concept of a hierarchical logical connection. The logical connection includes a virtual path (VP) that may contain one or more virtual channels (VCs). In addition, multiple streams of packetized data may be multiplexed onto a single VC through the use of a channel identifier (CID) associated with each stream. As illustrated in FIG. 1, ATM also includes multiple layers, such as the physical layer, the ATM layer, and various ATM adaptation layers (AALs) (e.g., ATM adaptation layer 2 (AAL2)) that may interface with other higher layers. Each of the layers may support different services and each may include various sublayers.

The AAL2 layer supports ATM transport of connection-oriented variable bit rate (VBR) packetized data, such as voice data and video data. The AAL2 layer typically communicates with a higher layer to transmit and receive the VBR data, generally in a time division multiplexed (TDM) format. The AAL2 layer also includes a common part sublayer (CPS) that interfaces to the ATM layer.

Data received by the AAL2 layer are encapsulated in CPS packets that are similar to, for example, the packet of FIG. 2A, and that include a 3-octet header and a variable length payload of from 1 to 64 octets. Next, CPS protocol data units (CPS-PDUs) (illustrated with respect to FIG. 2B) are formed from 48-octets of CPS packets. Because of the variable CPS packet size, a CPS-PDU may contain multiple CPS packets, or a single CPS packet may span multiple CPS-PDUs. Once packed, the 48-octet CPS-PDU is communicated to the ATM layer to form a complete payload of an ATM cell, as illustrated by FIG. 2C.

The AAL2 also may receive CPS-PDUs from the ATM layer, from which CPS packets may be extracted and passed up to the AAL2 for processing. The process of packing CPS packets into CPS-PDUs and of extracting packets from CPS-PDUs may be referred to collectively as segmentation and reassembly (SAR).

The ATM layer receives CPS-PDUs from the AAL2 and constructs 53-octet ATM cells from them by adding a 5-octet header and by using the 48-octet CPS-PDU as the ATM cell payload (see, e.g., FIG. 2C). The ATM layer also accepts 53-octet ATM cells from the physical layer and unpacks the CPS-PDUs from them to pass up to the AAL2. Based upon information stored in the cell headers, the ATM cells are multiplexed, switched and controlled by the ATM layer.

Finally, the physical layer accepts cells from the ATM layer and frames them for transmission over an electrical or optical transmission medium. The physical layer also accepts frames from the transmission medium and unpacks the ATM cells from the frames.

DESCRIPTION OF DRAWINGS

FIG. 1 is a schematic diagram illustrating a layered structure of the ATM technology.

Like reference symbols in the various drawings indicate like elements.

DETAILED DESCRIPTION

A method of transporting variable length AAL CPS packets over a non-ATM-specific bus is described along with systems and software for implementing the method. For example, a variable length AAL CPS packet, such as, for example, an AAL2 CPS packet, may be used to transport VBR data between a higher layer channel (e.g., a higher layer multiplexed channel) and a physical layer channel over a non-ATM-specific bus. The method allows communication of data both between the physical channel and the higher layer channel (upstream) and between the higher layer channel and the physical channel (downstream). Upstream communications and downstream communications generally are similar, with the first being essentially the reverse of the second. Hence, aspects of the downstream communication are described in detail and a description of corresponding aspects of the upstream communication is omitted for brevity. For clarity of exposition, the description proceeds from an account of a generalized system to a detailed recitation of illustrative roles, configurations, and components of the system.

Figure 3:
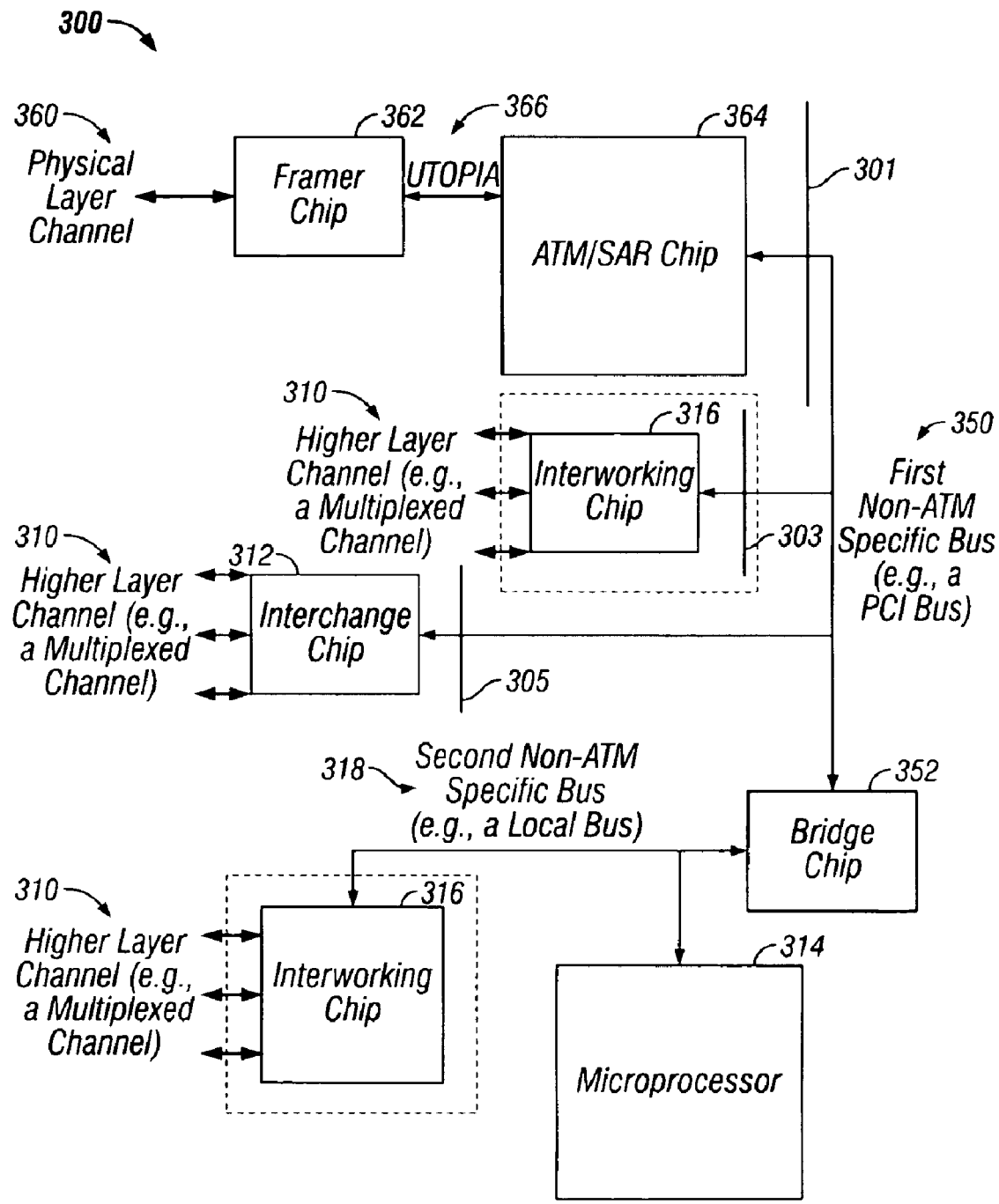
FIG. 3 is a schematic diagram of a system in which a variable length AAL CPS packet may be used to transport VBR data between a higher layer channel and a physical layer channel over a non-ATM-specific bus.

Referring to FIG. 3, a generalized system 300 uses variable length AAL CPS packets (e.g., AAL2 CPS packets) to transport data (e.g., VBR data) between a higher layer channel 310 and a physical channel 360. The higher layer channel 310 may include a higher layer multiplexed channel, such as, for example, a Time Division Multiplexed (TDM) channel, a Code Division Multiplexed (CDM) channel, and/or a Frequency Division Multiplexed (FDM) channel, whether wired or wireless, while the physical layer channel may include, for example, a Synchronous Optical Network (SONET), a Fiber Distributed Data Interface (FDDI), a Token Ring, or a Fiber channel, whether wired or wireless. Exemplary components of the system 300 are described.

The system 300 may include a motherboard (not shown) and one or more modular circuit boards (not shown), such as, for example, backplanes and/or daughter-cards that may connect to the motherboard and/or each other, for example, through connectors (e.g., connectors 301, 303, 305). Moreover, the backplanes and daughter-cards themselves may connect to other systems. The system 300 also may include one or more non-ATM-specific buses, such as, for example, a Peripheral Component Interface (PCI) bus, an Industry Standard Architecture (ISA) bus, an Extended Industry Standard Architecture (EISA) bus, an IEEE (Institute for Electrical and Electronics Engineers) 1394 bus, a local bus, or any other non-ATM-specific bus for transporting data. Various devices (e.g., an interchange chip 312, a microprocessor 314, an interworking chip 316, a bridge chip 352, a framer 362, and/or an ATM/SAR chip 364) may reside on the non-ATM-specific buses, and the buses and/or devices may be configured to reside on any of the motherboard and/or the modular circuit boards, or any combination of these circuit boards.

The interchange chip 312 included in the system may connect to a first non-ATM-specific bus (e.g., PCI bus 350), And the microprocessor 314 may reside on a second non-ATM-specific bus (e.g., local bus 318). Bridge chip 352 may reside on both the local bus 318 and the PCI bus 350 to allow communication between the microprocessor 314 on the local bus 318 and the interchange chip 312 on the PCI bus 350. Rather than using the bridge chip 352 to communicate over the PCI bus 350, the microprocessor 314 may be configured to interface directly to the PCI bus 350 (not shown). The interchange chip 312 may be configured to interface with the higher layer channel 310. For example, the interchange chip 312 may receive and demultiplex VBR data packets from the higher layer channel 310, and may communicate the demultiplexed VBR data packets to the microprocessor 314. The microprocessor 314 may be configured to map VBR data packets received from the interchange chip 312 into appropriate ATM virtual paths and virtual channels and to generate AAL2 CPS packets to encapsulate the VBR data packets. In addition, or in the alternative, the system 300 may include an interworking chip 316 that may combine the functionality that is provided jointly by the interchange chip 312 and the microprocessor 314 and that is described above. The interworking chip 316 may reside, for example, on the PCI bus 350 and/or the local bus 318.

The system also may include an ATM/segmentation and reassembly (ATM/SAR) chip 364 that may reside, for example, on the PCI bus 350 and may receive AAL2 CPS packets. The AAL2 CPS packets may be received, for example, through peer-to-peer communication over the PCI bus 350, as between the interworking chip 316 and the ATM/SAR chip 364. The AAL2 CPS packets also may be received through communication between the ATM/SAR chip 364, located on the PCI bus 350, and the microprocessor host 314, located on the local bus 318, where the bridge chip 352 may act as a conduit for the communication. The ATM/SAR chip 364 may be configured to save the AAL2 CPS packets in a buffer for subsequent processing when they are received. For example, the ATM/SAR chip 364 may include internal and/or external memory that may include reserved PCI memory space (not shown). A FIFO (first in first out) buffer may reside in the reserved PCI memory space and may include a memory ring of programmable size (not shown). The ATM/SAR chip 364 may produce CPS-PDUs from the buffered AAL2 CPS packets, and may convert the CPS-PDUs into ATM cells.

The system 300 also may include a framer chip 362 that may be configured to frame the ATM cells and transmit them over a physical layer channel 360. The framer chip may be configured to communicate with the ATM/SAR chip 364 over, for example, a UTOPIA (Universal Test and Operations Interface for ATM) bus 366. The framer chip 362 may receive ATM cells from the ATM/SAR chip 364 over the UTOPIA bus 366 and may frame and transmit the ATM cells on the physical layer channel 360.

The ATM interface chips (e.g., the interchange chip 312, the microprocessor 314, the interworking chip 316, the bridge chip 352, the framer chip 362, and/or the ATM/SAR chip 364) all may include one or more general-purpose or special-purpose hardware components or software components, such as, for example, a circuit, a code segment, a bus interface module, a core logic unit, a control module, a processing module, a transceiver, a communications card, an antenna, a modem, a digital signal processing (DSP) core, or a combination of any or all of these systems.

Figure 4A:
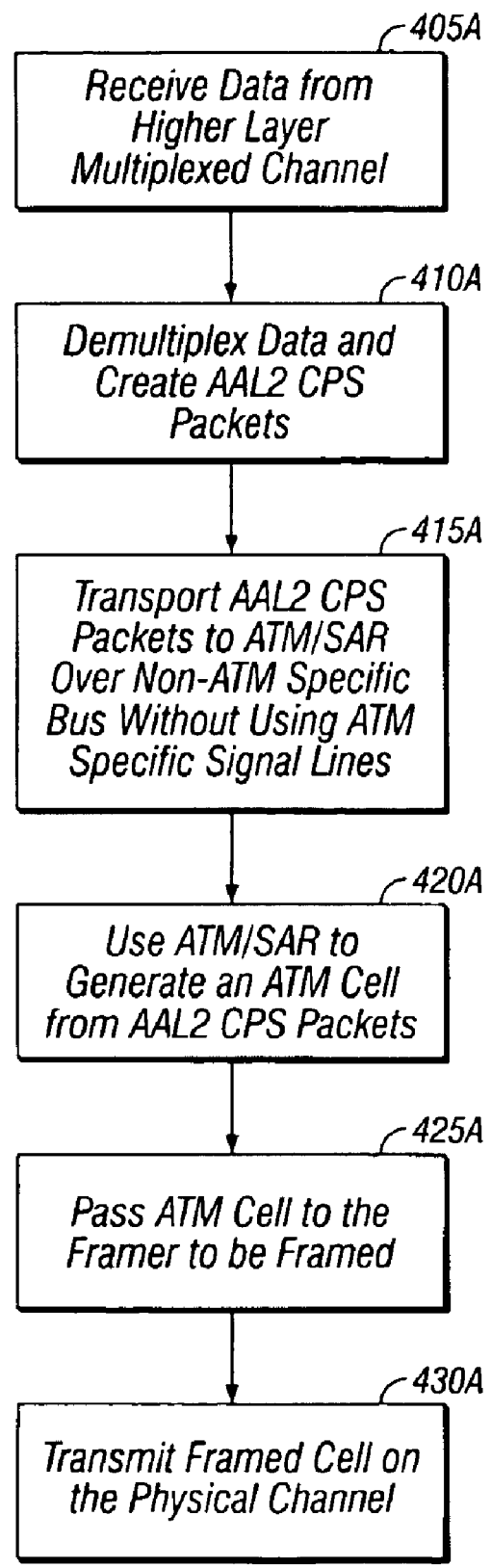
FIGS. 4A and 4B are schematic flow diagrams illustrating methods implementable by the ATM system of FIG. 3 with respect to egress data (FIG. 4A) and ingress data (FIG. 4B).
Figure 4B:
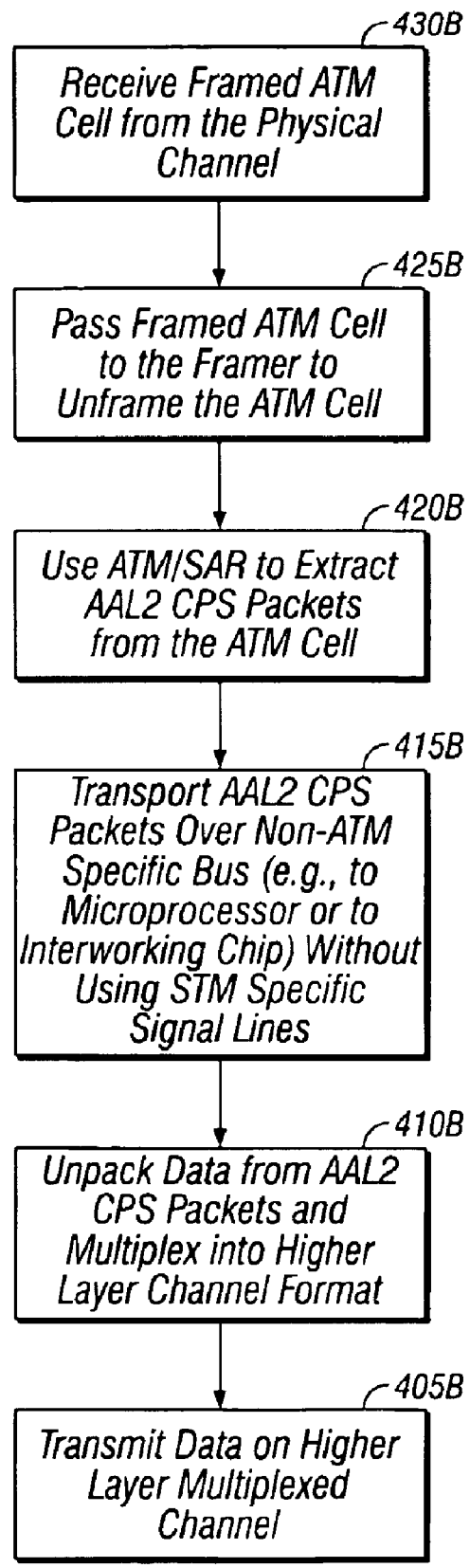

FIGS. 4A and 4B illustrate methods for using variable length AAL CPS packets (e.g., AAL2 CPS packets) to transport data (e.g., VBR data) between a higher layer channel 310 and a physical channel 360 that may, for example, be implemented in the system of FIG. 3. FIG. 4A illustrates a method for passing VBR data downstream while FIG. 4B illustrates a process for passing VBR data upstream. The methods generally are similar and symmetrical. For ease of description, aspects of the method of FIG. 4A are described in detail and a description of corresponding aspects of the method of FIG. 4B is omitted for brevity.

Referring to FIG. 4A, a downstream VBR data packet is received from a higher layer channel (e.g., a higher layer multiplexed channel) 310, for example, by the interchange chip 312 or the interworking chip 316 (step 405A). The downstream VBR data packet is demultiplexed and encapsulated in a variable length AAL CPS packet (e.g., an AAL2 CPS packet) (step 410A). The demultiplexing and encapsulation may be performed by one device, such as, for example, the interworking chip 316. Alternatively, the demultiplexing may be performed by the interchange chip 312 to create demultiplexed data that the microprocessor 314 then may encapsulate in the AAL2 CPS packet.

Following the demultiplexing and encapsulation of the downstream data (step 410A), the AAL2 CPS packet may be transported to the ATM/SAR chip 364 over a non-ATM-specific bus, such as, for example, the PCI bus 350 and/or the local bus 318 (step 415A). The ATM/SAR chip 364 then may encapsulate the AAL2 CPS packet into an AAL2-PDU that may be used to produce an ATM cell (step 420A).

Following the generation of the ATM cell, the ATM/SAR chip may communicate the ATM cell to the framer chip 362 over, for example, the UTOPIA bus 366 (step 425A). The framer chip 362 may frame the ATM cell, for example, using a SONET frame, and then may transmit the framed ATM cell over the physical layer channel (e.g., an optical channel, or an electrical channel) 360 (step 430A).

FIG. 4B illustrates a process for passing VBR data upstream from a physical channel 360 to a higher layer channel 310. The process generally is similar to the process of FIG. 4A and includes steps that, although performed in reverse order, correspond generally to the steps of the process of FIG. 4A. For example, step 405B, in which data are transmitted on a higher layer multiplexed channel, corresponds generally to step 405A of FIG. 4A, in which data are received from a higher layer multiplexed channel.

Figure 5:
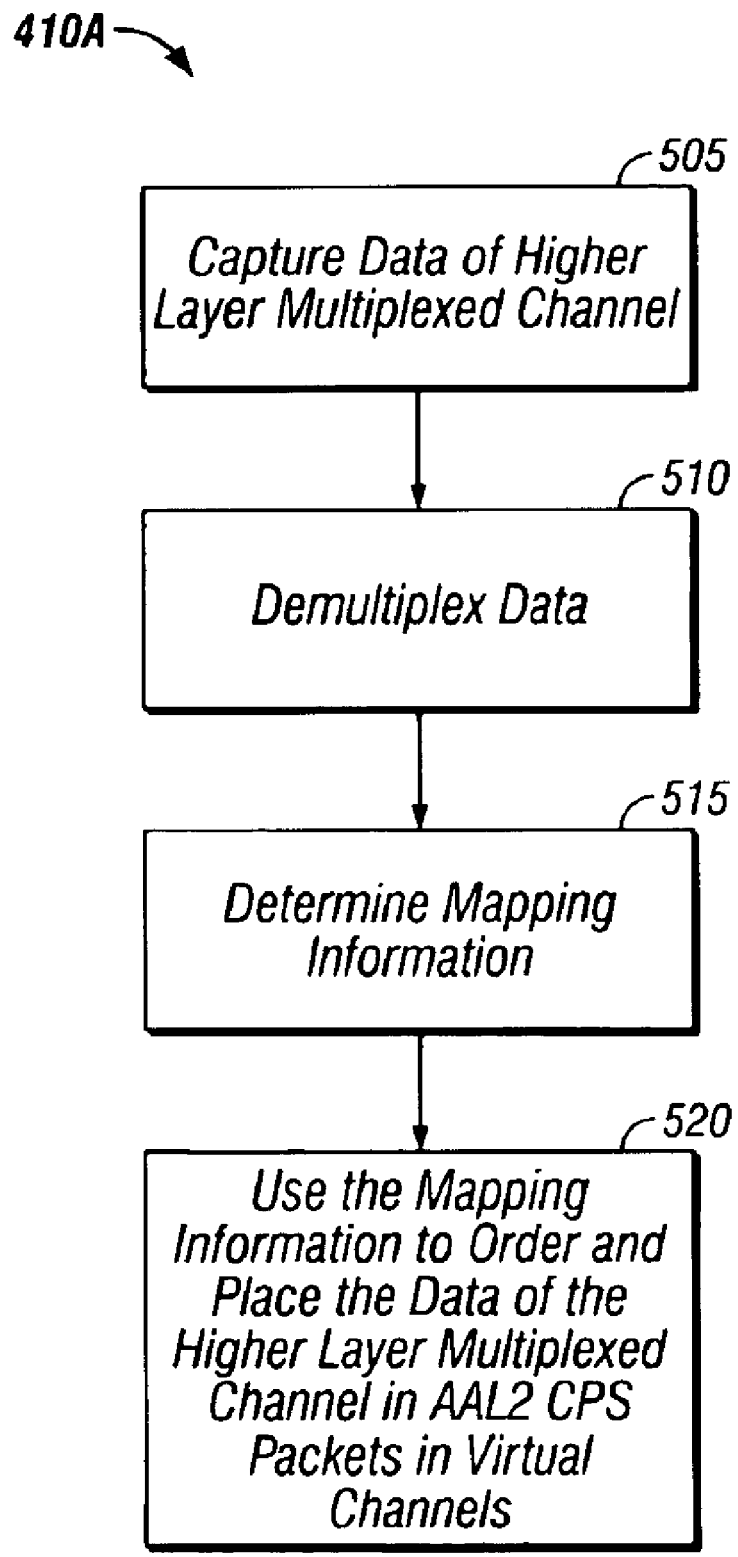
FIG. 5 is a schematic flow diagram illustrating a method that may be used in implementing the method of FIG. 4A to convert the data from the higher layer multiplexed channels into ATM AAL2 CPS format packets.

FIG. 5 illustrates a method 410A of using VBR data packets received from a higher layer channel 310, such as, for example, a TDM channel, to generate an AAL2 CPS packet. The VBR data packets are captured (step 505) and demultiplexed (step 510), and mapping information then is determined for mapping the demultiplexed data packets to appropriate virtual channels (step 515). The mapping information may be determined, for example, from a stored look-up table or may be determined dynamically based on feedback information indicating, for example, unused channel capacity and/or a channel quality of service. For example, a mapping function may use the feedback information to determine a virtual channel that is minimally congested and/or that provides a maximum channel quality of service. The downstream data then may be encapsulated in an AAL2 CPS packet associated with an appropriate virtual channel, as indicated by the determined mapping information (step 520). The mapping information may or may not be appended to a beginning or an end of an AAL2 CPS packet (not shown).

Figure 6:
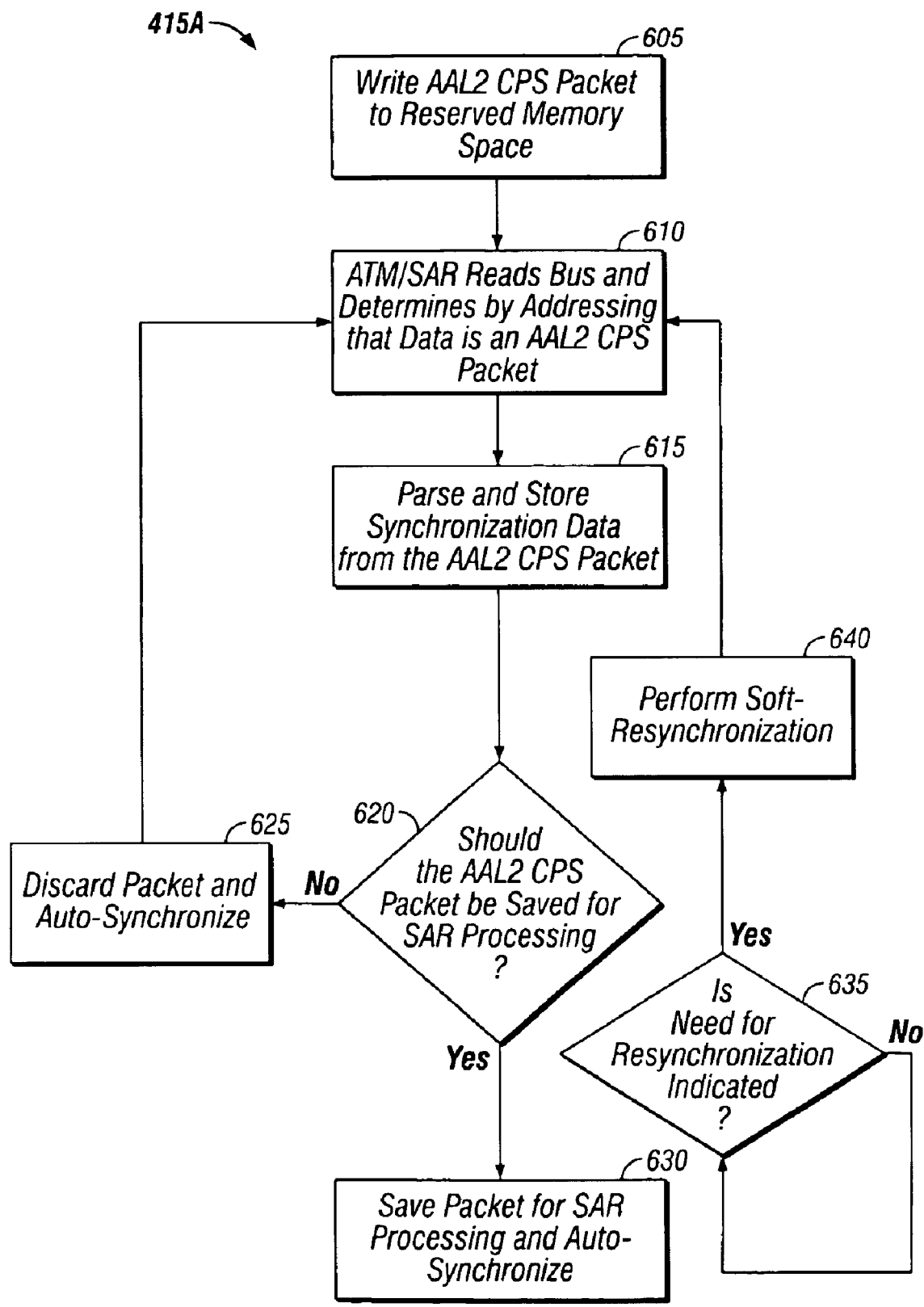
FIG. 6 is a schematic flow diagram illustrating a method that may be used in implementing the method of FIG. 4A to communicate the AAL2 CPS packets to the ATM/SAR chip over a non-ATM-specific bus.

FIG. 6 illustrates a method 415A that may be used to transport the variable length AAL CPS packet (e.g., the AAL2 CPS packet) to the ATM/SAR chip 364 over a non-ATM-specific bus. The downstream AAL2 CPS packet may be written over one or more non-ATM-specific buses (e.g., the local bus 318 and/or the PCI bus 350) to an address associated with an area of memory reserved for AAL2 CPS packets (step 605). The ATM/SAR chip 364 may execute a read cycle to access data written onto the non-ATM-specific bus and may determine based, for example, on the address associated with the data, that the data correspond to an AAL2 CPS packet (step 610). The ATM/SAR chip may determine synchronization information based on the AAL2 CPS packet (step 615) (discussed in detail below), and also may determine whether the AAL2 CPS packet should be saved for SAR processing (step 620). If the ATM/SAR chip 364 determines that the AAL2 CPS packet should not be saved for SAR processing (step 620), then the ATM/SAR chip may discard the packet (step 625). Otherwise, the packet may be saved and processed (step 630).

Determining synchronization information (step 615) may include determining a synchronization counter and/or a synchronization threshold. The synchronization counter and/or the synchronization threshold may be based, for example, on a length of the packet. A total length of the packet may be determined, for example, based on the contents of the "LI" field of the packet header that indicates the length of the packet payload in octets, minus one. Thus, for a packet with an LI=15, the total packet length would be equal to 19-octets, determined as the length of the packet header plus the LI value plus one.

The synchronization information may be used by the ATM/SAR chip 364 to recognize an end of the current AAL2 CPS packet and/or a beginning of a next AAL2 CPS packet. In addition, a resynchronization procedure may be executed to perform a soft-resynchronization of the ATM/SAR chip 364 (step 640) if a determination is made that synchronization has been lost or that resynchronization would otherwise be beneficial (step 635). The soft-resynchronization may be performed without the use of ATM-specific signal lines or a hard-reset (e.g., a powerdown of a device). For example, it may be determined that synchronization has been lost when feedback data indicates that data transmitted downstream arrives garbled at the data's destination. Also, the resynchronization procedure (step 640) may be executed automatically after passage of a certain interval of time, and/or during a period in which the ATM/SAR chip 364 generally is less active.

In implementing method 415A of FIG. 6, it may aid synchronization (discussed in greater detail with respect to FIGS. 7 and 8) to impose additional structure, such as, for example, data alignment through use of certain structural features of the bus (i.e., logical and/or physical features) or use of bus protocol flexibility. For example, PCI bus 350 is a parallel bus with a data path that generally is 4-octets (32 bits) wide, such that communicating any but a minimum-sized AAL2 CPS packet over the PCI bus 350 uses multiple read-write cycles of the PCI bus 350. In other words, because the width of the bus 350 typically is less than the length of the packet, the packet usually must be delivered in pieces. It may be desirable (e.g., with respect to the method of FIG. 7) in writing an AAL2 CPS packet over the bus 350, that the first octet of the packet always align with the lowest order octet of the bus 350 (e.g., D[7–0]). This may ensure that multiple AAL2 CPS packets will not share a bus read-write cycle. It also may be desirable (e.g., with respect to the method of FIG. 8) to cause the first octet of an AAL2 CPS packet to align with the first bus octet that follows the last octet occupied by a preceding AAL2 CPS packet. For example, if the last octet of the preceding packet occupies the octet D[15–8], then the first octet of the next packet may align with the octet D[23–16] of the bus 350.

Figure 7:
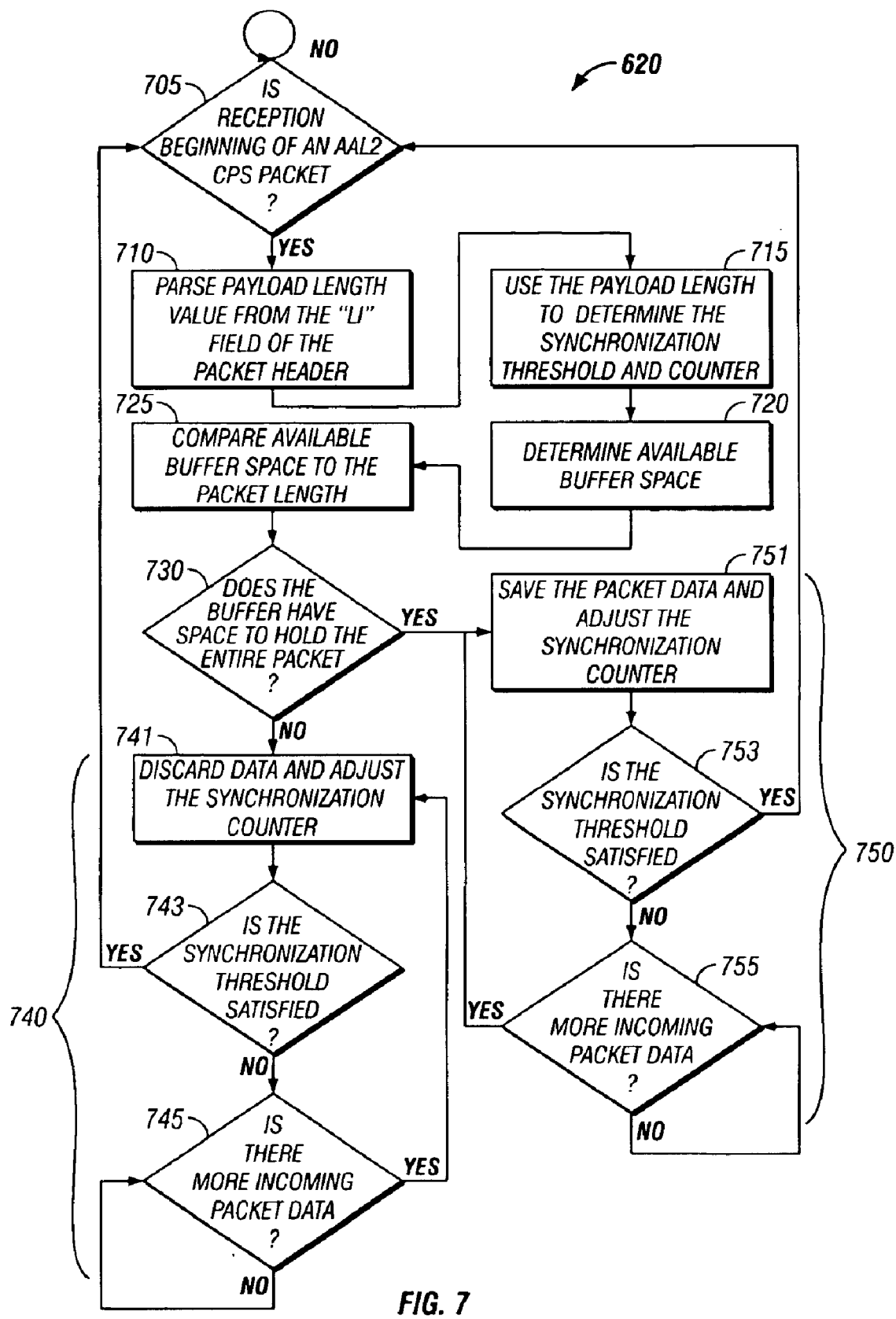
FIGS. 7, 8, 9A and 9B, 11A and 11B, and 12A and 12B are schematic flow diagrams illustrating methods that may be used in implementing the method of FIG. 6.

FIG. 7 illustrates a method 620 to determine if a variable length AAL CPS packet (e.g., an AAL2 CPS packet) should be saved for processing. Upon determining that the ATM/SAR chip 364 has begun to receive a variable length AAL CPS packet (step 705), the ATM/SAR chip 364 may parse from a header of the packet a value representing a length of the packet (step 710). For example, if the variable length AAL CPS packet is an AAL2 CPS packet, then the packet header contains a value in an LI field of the header indicative of a length of a payload of the packet (i.e., the payload length in octets minus one) that may be used to determine a total packet length (e.g., the payload length in octets plus the header length in octets). A value that may or may not be based on the packet length then may be stored as the synchronization counter (e.g., the packet length, zero) (step 715). In like manner, another value that also may or may not be based on the packet length may be stored as the synchronization threshold (e.g., zero, the packet length) (step 715).

The ATM/SAR chip 364 may determine available space in the FIFO buffer (e.g., a number of octets of available buffer space) (step 720) and may compare the available buffer space to the packet length (step 725). If the packet length indicates that currently there is insufficient buffer space to save the entire packet (step 730), then a determination may be made that the packet should not be saved, but, rather, should be discarded (step 740). Otherwise, if it is determined that the packet should be saved (step 730), then the entire packet may be accepted and saved into the FIFO buffer (step 750). In either case, upon determining to save or to discard the packet (step 730), the synchronization information may be used to maintain synchronization automatically. The originally received octets of the packet are either saved (step 751) or discarded (741) and the synchronization counter is adjusted accordingly (e.g., incremented, decremented) (steps 741 and 751).

A determination then is made as to whether the adjusted synchronization counter satisfies the synchronization threshold (steps 743 and 753), thus indicating, for example, the end of one packet and/or the beginning of a next packet. For example, when the synchronization counter is set initially to the packet length and then is decremented for each octet received, arrival of the synchronization counter at a synchronization threshold of zero may indicate the end of the packet. In like manner, if the synchronization counter is set initially at zero and then is incremented for each octet received, arrival of the synchronization counter at a synchronization threshold equal to the packet length also may indicate that the end of the packet has been achieved.

If the synchronization threshold remains unsatisfied (steps 743 and 753), thus indicating that there are outstanding packet octets, then the outstanding packet octets are awaited and read as they arrive (steps 745 and 755). Once read (steps 745 and 755), the packet octets are either saved (step 751) or discarded (step (741) depending on whether the determination was made to save or discard the packet (step 730). Saving (step 750) or discarding (step 740) the AAL2 CPS packet continues until the synchronization threshold is satisfied (steps 743 and 745). Once the synchronization threshold is satisfied, the ATM/SAR chip looks for a beginning of a next AAL2 CPS packet (step 705) that may be used to refresh the synchronization information (steps 710 and 715).

Figure 8:
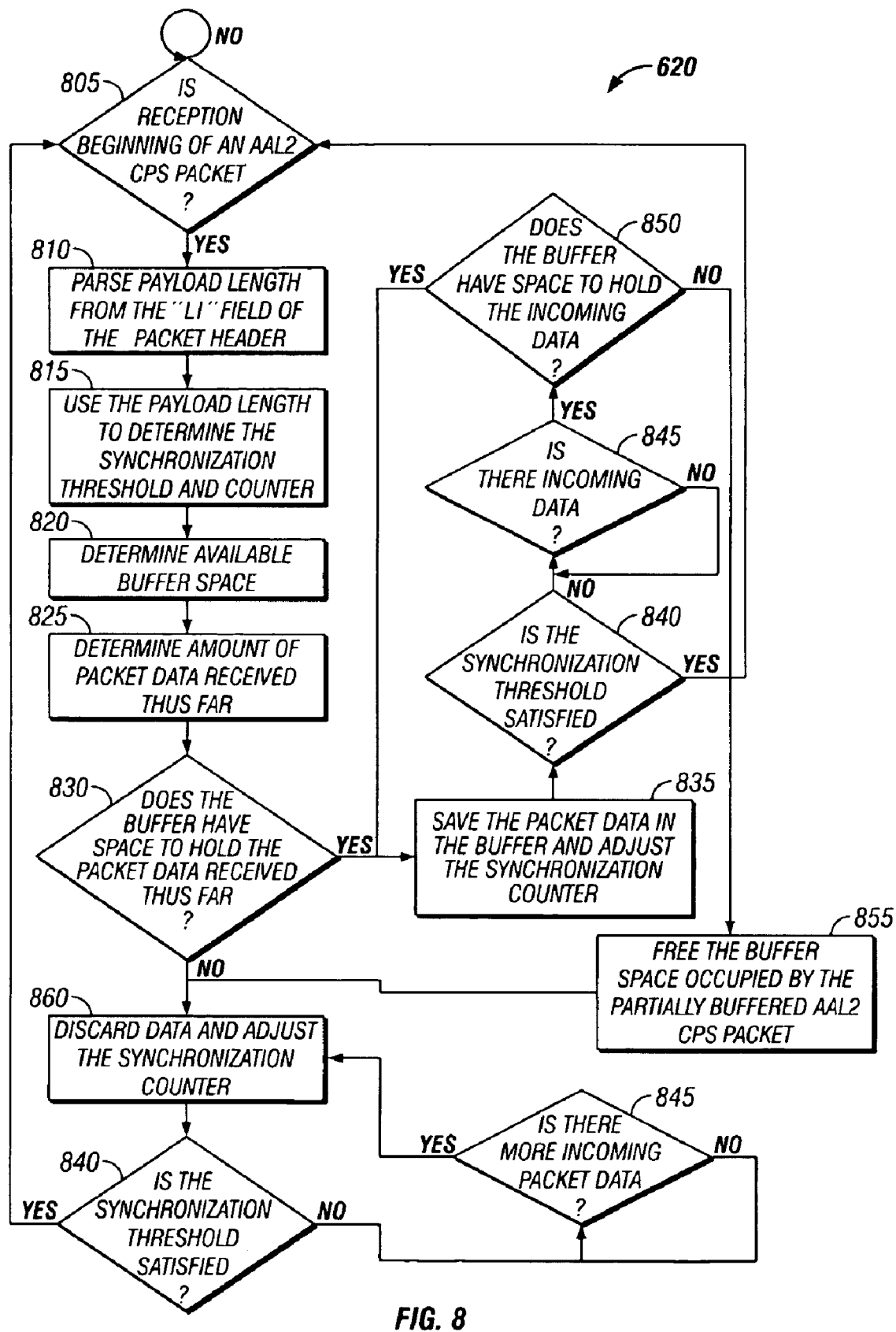

FIG. 8 illustrates another method 620 to determine if a variable length AAL CPS packet should be saved for processing. Initially, upon determining that the ATM/SAR chip 364 has begun to receive an AAL2 CPS packet (step 805), the ATM/SAR chip 364 may parse from the "LI" field of the packet header a value representing a length of the packet payload (i.e., the payload length in octets minus one) that then may be used to determine a total packet length (e.g., the payload length in octets plus the header length in octets) (step 810). A value that may be based on the packet length then may be stored as the synchronization counter (e.g., the packet length, zero) (step 815). In like manner, another value that also may or may not be based on the packet length may be stored as the synchronization threshold (e.g., zero, the packet length) (step 815).

The ATM/SAR chip 364 may determine the available space in the FIFO buffer (e.g., a number of octets of available buffer space) (step 820) and a number of octets of the AAL2 CPS packet determined as received thus far (step 825), and may compare these values (step 830). If the buffer has space sufficient to hold the packet data received thus far (step 830), then the packet data are saved and the synchronization counter is adjusted accordingly (e.g., incremented, decremented) (step 835). If, after adjustment, the synchronization counter satisfies the synchronization threshold (e.g., zero, the packet length) (step 840), then the ATM/SAR chip 364 waits to receive additional packet data (step 845).

When the packet data is received, and if buffer space is available to hold the received octets of packet data (step 850), the ATM/SAR chip 364 adjusts the synchronization counter and saves the packet data (step 835). The receiving and saving of the packet data may continue until the synchronization counter satisfies the synchronization threshold (step 840), thus indicating that the end of the packet has been reached. The ATM/SAR chip 364 then returns to its initial state and watches for the arrival of the next AAL2 CPS packet (step 805).

The receiving (step 845) and saving of the packet data (step 835) may be interrupted when the ATM/SAR chip 364 determines that the buffer does not have space sufficient to save the received octets of packet data (step 850). When buffer space is insufficient (step 850), the newly received data is discarded rather than saved and the synchronization counter is adjusted (step 860). Buffer space occupied by prior received octets of the AAL2 CPS packet also is freed (step 855). The receiving of data (step 845), discarding of data, and adjusting of the synchronization counter (step 860) continues until the synchronization counter satisfies the synchronization threshold (step 840). The ATM/SAR chip then returns to its initial state and watches for the arrival of the next AAL2 CPS packet (step 805).

Figures 9A, 9B:
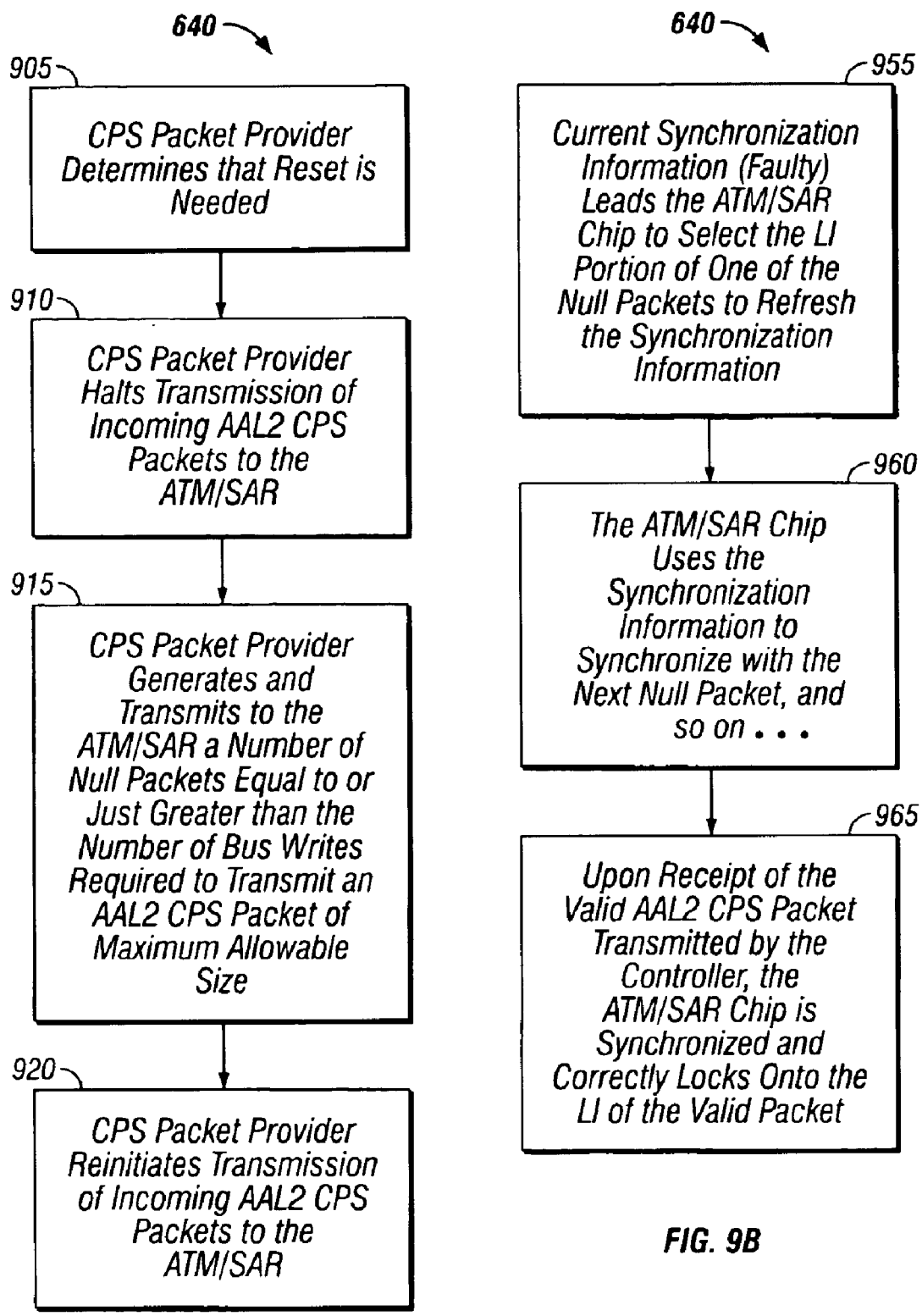

FIGS. 9A and 9B illustrate a method 640 to perform a soft-resynchronization of the ATM/SAR chip 364 by providing to the ATM/SAR chip 364 a series of null AAL CPS packets. A null AAL CPS packet is a minimum-sized AAL CPS packet, such as, for example, an AAL2 CPS packet with all-zero contents (i.e., both the header and the payload). FIG. 9A illustrates operation of a CPS packet provider (e.g., the microprocessor 314 or the interworking chip 316) used to provide the null AAL CPS packets, while FIG. 9B illustrates operation of the ATM/SAR chip 364. In the method 640, all AAL2 CPS packets (i.e., both null and valid) that are provided may share a common bus alignment that will allow for transmission of a null AAL CPS packet in a single read-write operation. For example, in a 4-octet bus, all packets may be aligned with the octet D[7–0], such that the LI field for every AAL2 CPS packet may occupy the data bits D[13–8] of the bus so as to provide four contiguous octets of the bus to transmit a four-octet null AAL CPS packet.

As illustrated in FIG. 9A, the CPS packet provider makes a determination that resynchronization should be performed (described in greater detail with respect to FIG. 6) (step 905). The CPS packet provider then halts transmission of additional AAL2 CPS packets (step 910). Next, null AAL2 CPS packets are generated and transported to the ATM/SAR chip (step 915). The number of null AAL2 CPS packets to be sent may be pre-determined as equal to a number of bus writes used to write an AAL2 CPS packet of maximum size. For example, for an AAL2 CPS packet of a maximum allowed length of 67 octets, the number of writes used to communicate the entire packet on a 32 bit PCI bus may equal 17. Following transmission of the null AAL2 CPS packets (step 915), the controller reinitiates transmission of incoming AAL2 CPS packets to the ATM/SAR chip 364 for SAR processing (step 920).

As illustrated in FIG. 9B, once the ATM/SAR chip 364 begins receiving the null packets from the CPS packet provider, the ATM/SAR chip 364 is lead by the synchronization information to refresh the synchronization information based on the "LI" field of one of the null AAL2 CPS packets (described in greater detail with respect to FIG. 10) (step 955). The use of the refreshed synchronization information synchronizes the ATM/SAR chip 364 with the beginning of the next packet that is received, whether it be another null AAL2 CPS packet (step 960) or a valid AAL2 CPS packet (step 965).

Figure 10:
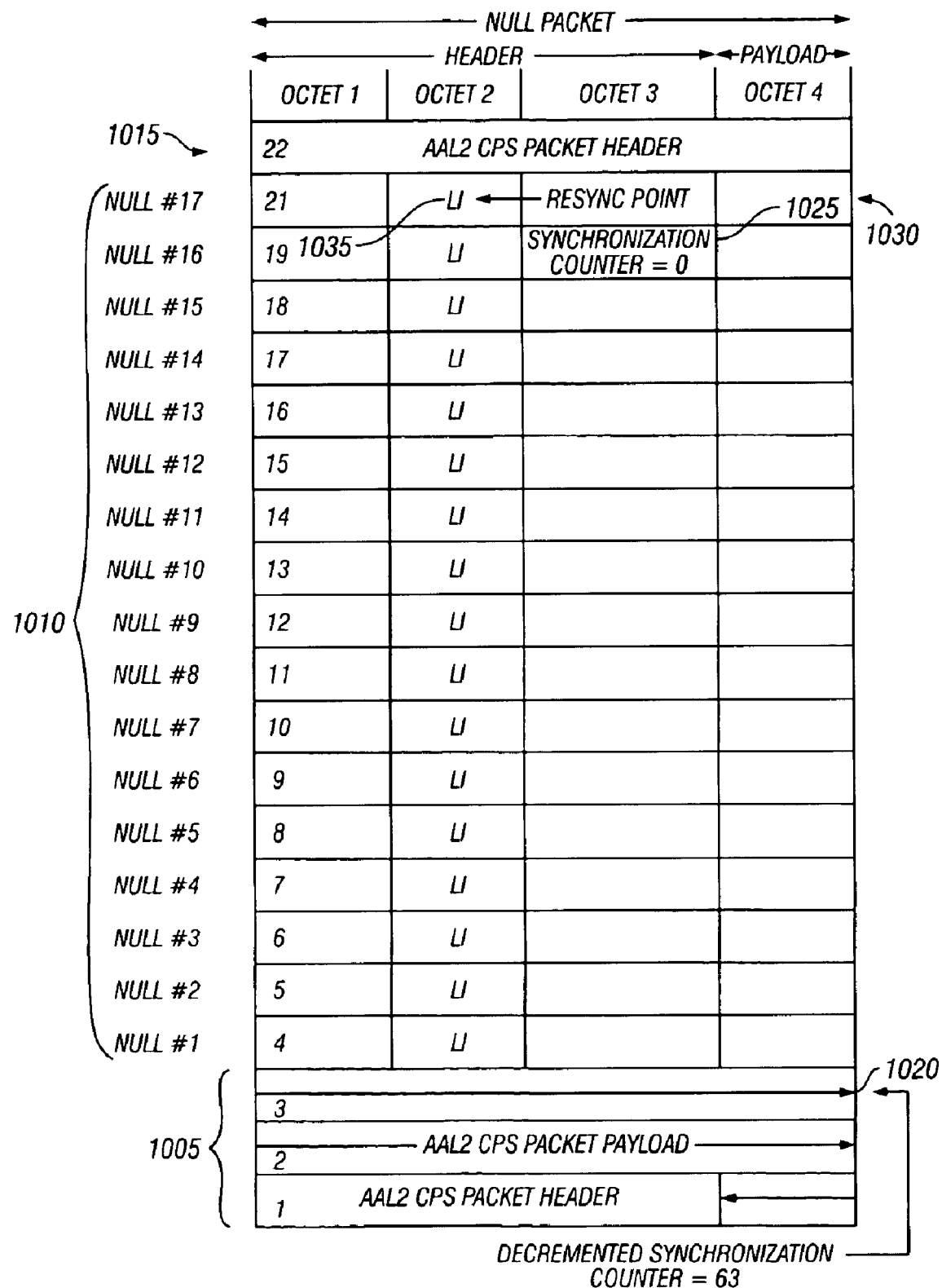
FIG. 10 is a schematic diagram illustrating an example of the use of the method of FIGS. 9A and 9B.

FIG. 10 describes a series of 22 read-write cycles that illustrate in greater detail the use of the null AAL2 CPS packets to resynchronize the ATM/SAR chip 364 as described in FIGS. 9A and 9B. Initially, three read-write cycles 1005 are used to transport an AAL2 CPS packet that begins with its header in the first read-write cycle, but whose transmission is cut off after the third read write cycle. Seventeen null packets then are transmitted, one per each of the next seventeen read-write cycles 1010. Finally, in the twenty-first read-write cycle 1015, transmission of another valid AAL2 CPS packet begins.

In the example of FIG. 10, the ATM/SAR chip 364 is out of synchronization at the end of the third read-write cycle 1020, if not before. At the end of the third write cycle 1020, the decremented value of the synchronization counter is shown as 63. Although not synchronized, the ATM/SAR chip 364 continues to take in packet octets while decrementing the synchronization counter accordingly. The synchronization counter eventually decrements to zero and satisfies the synchronization threshold after the third octet of null packet sixteen is read in 1025. Satisfaction of the synchronization threshold, equal to zero in this example, signals the ATM/SAR chip 364 to expect a fresh AAL2 CPS packet in the next read-write cycle that conveys AAL2 CPS packet information. The ATM/SAR chip 364 resynchronizes, therefore, on null packet seventeen 1030, using the LI value 1035 of null packet seventeen 1030 to refresh the synchronization information. The refreshed resynchronization information, in turn, leads the ATM/SAR chip 364 successfully to synchronize with the valid AAL2 CPS packet of the twenty-first read-write cycle 1015, and, synchronization being restored, with any other subsequently received incoming AAL2 CPS packets.

Figures 11A, 11B:
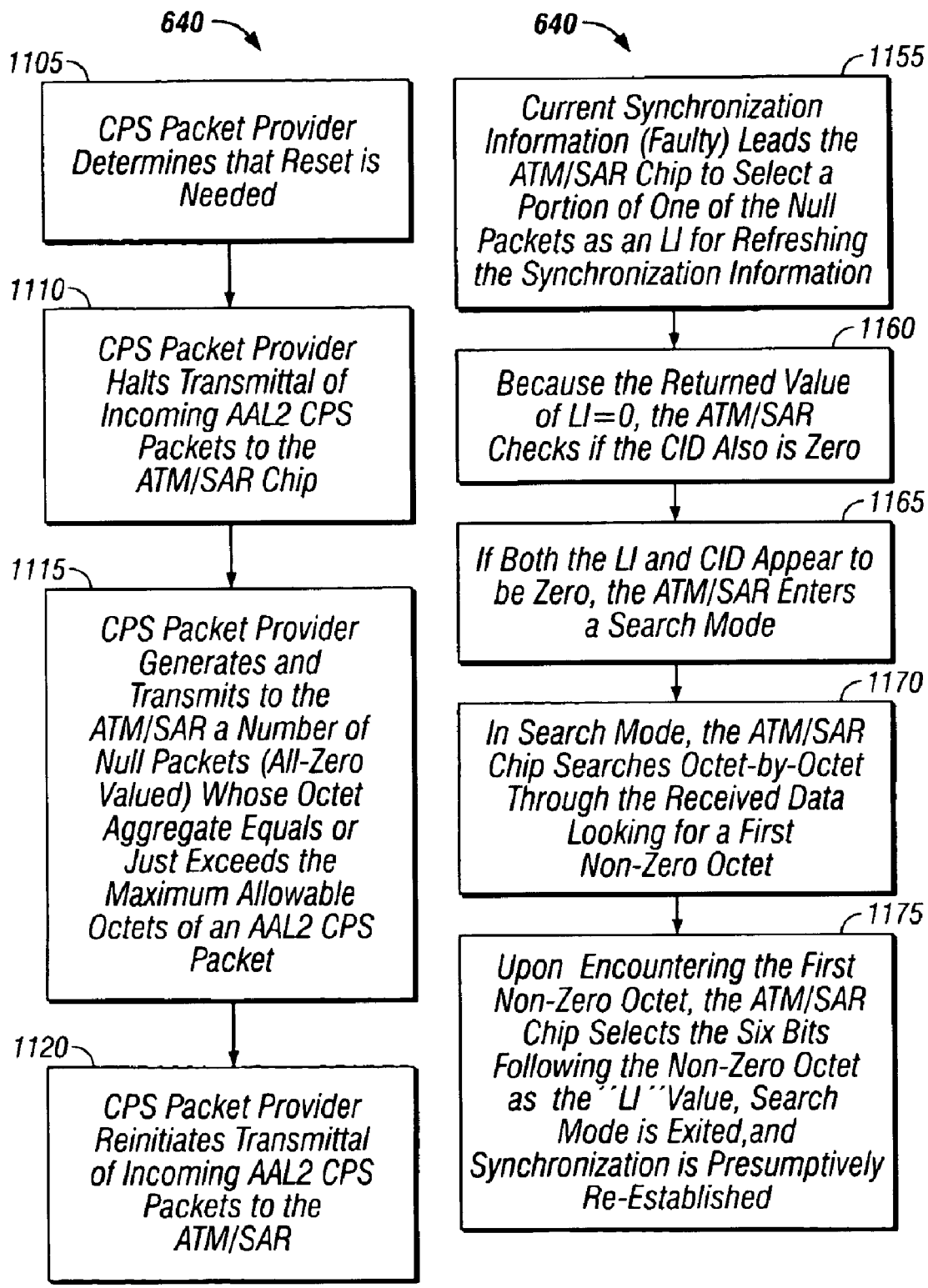

FIGS. 11A and 11B illustrate another method 640 to perform a soft-resynchronization of the ATM/SAR chip 364 by transmitting to the ATM/SAR chip 364 a series of null AAL CPS packets (e.g., null AAL2 CPS packets). FIG. 11A illustrates operation of the CPS packet provider used to provide the null AAL2 CPS packets, while FIG. 11B illustrates operation of the ATM/SAR chip 364. In the method 640, a channel identifier equal to zero (CID=0) may be reserved for use during resynchronization (described in further detail below). Also, all transmitted AAL2 CPS packets may be octet aligned with the bus. For example, in the case of a 4-octet bus, the first octet of an AAL2 CPS packet, whether valid or null, may align with one of either D0, D8, D16, or D24 of the bus.

As illustrated in FIG. 11A, the CPS packet provider may determine that resynchronization should be performed (step 1105), and may halt the transmission of additional AAL2 CPS packets (step 1110). Next a number of null AAL2 CPS packets are generated and communicated to the ATM/SAR chip (step 1115). The required number of null AAL2 CPS packets may be determined as equal to a number of null AAL2 CPS packets whose octet aggregate equals or just exceeds the maximum allowable octet size of an AAL2 CPS packet (e.g., 67 octets). For example, in a system in which the packet header is three octets long and the maximum allowed packet length is 67 octets, a null AAL2 CPS packet may be four octets long. Hence, at least 17 null AAL CPS packets should be written to ensure that the ATM/SAR chip does not count over all of them before the synchronization counter satisfies the synchronization threshold. Following transmission of the appropriate number of null AAL2 CPS packets (step 1115), the CPS packet provider may reinitiate transmission of valid incoming AAL2 CPS packets to the ATM/SAR chip 364 for SAR processing (step 1120).

Figures 2A, 2B:
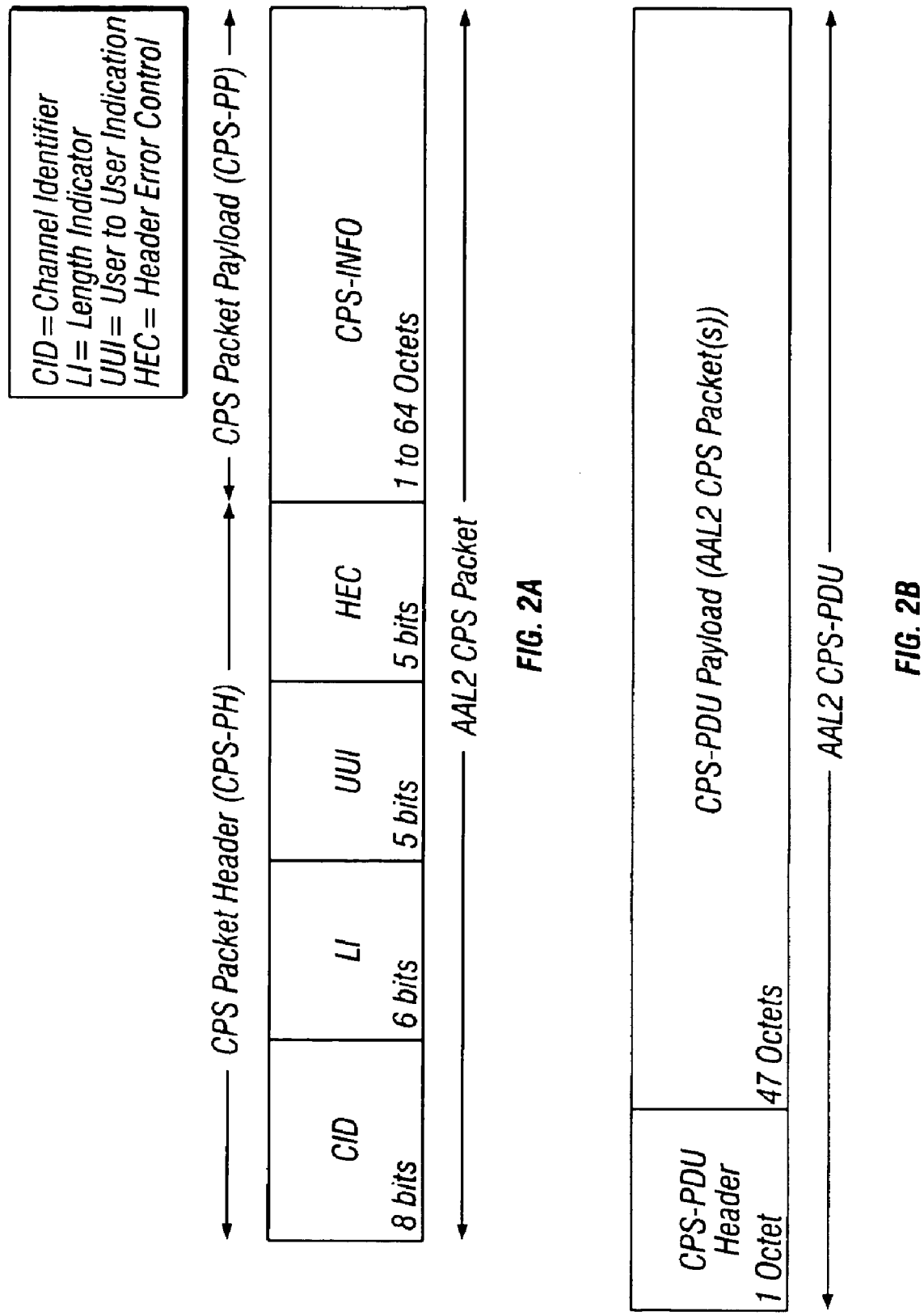
FIGS. 2A–2C are schematic diagrams illustrating typical formats for an AAL2 CPS packet, an AAL2 CPS-PDU, and an ATM cell, respectively.
Figure 2C:
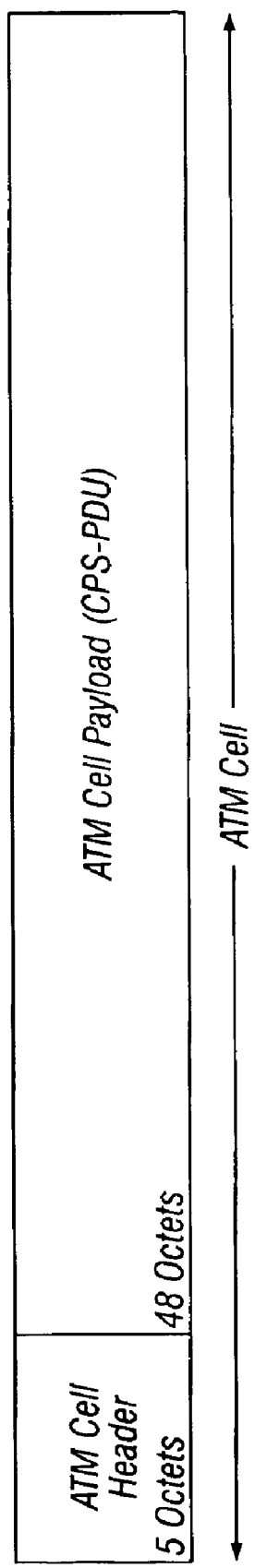

As illustrated in FIG. 11B, the ATM/SAR chip 364, once it begins receiving the null AAL2 CPS packets from the controller, will be lead by the synchronization counter to select a portion of one of the null AAL2 CPS packets as an LI to refresh the synchronization information (step 1155). The portion of the null AAL2 CPS packet selected may or may not align with the LI field of that null AAL2 CPS packet, but, nevertheless, will contain a value of zero. Upon determining a value of zero for the LI (step 1155), the ATM/SAR chip 364 also may parse the octet immediately preceding the six bits from which the zero LI value was extracted to determine a CID value (refer to the AAL2 CPS packet header format shown in FIG. 2A) (step 1160). Where both the LI value and the CID value are zero, the ATM/SAR chip may enter a search mode (step 1165).

The additional check of the value of the CID helps prevent the ATM/SAR from erroneously entering the search mode. For example, without the CID check, a valid AAL2 CPS packet of minimum length (LI=0) but with a non-zero CID may send the ATM/SAR into search mode erroneously. The CID check counters this fault, as the valid minimum length packet may have a nonzero CID, with a zero CID being reserved for null AAL CPS packets.

Having entered the search mode (step 1165), the ATM/SAR chip may search octet-by-octet through the received data (all zero data with respect to the null AAL CPS packets) until a non-zero octet is encountered (step 1170). Because a zero CID is reserved for null AAL CPS packets, the non-zero octet signals to the ATM/SAR chip the beginning of a valid AAL2 CPS packet. The ATM/SAR may use the LI value of the AAL2 CPS packet to refresh the synchronization information (step 1175). The search mode then is exited, with synchronization having been reestablished (step 1175).

Figures 12A, 12B:
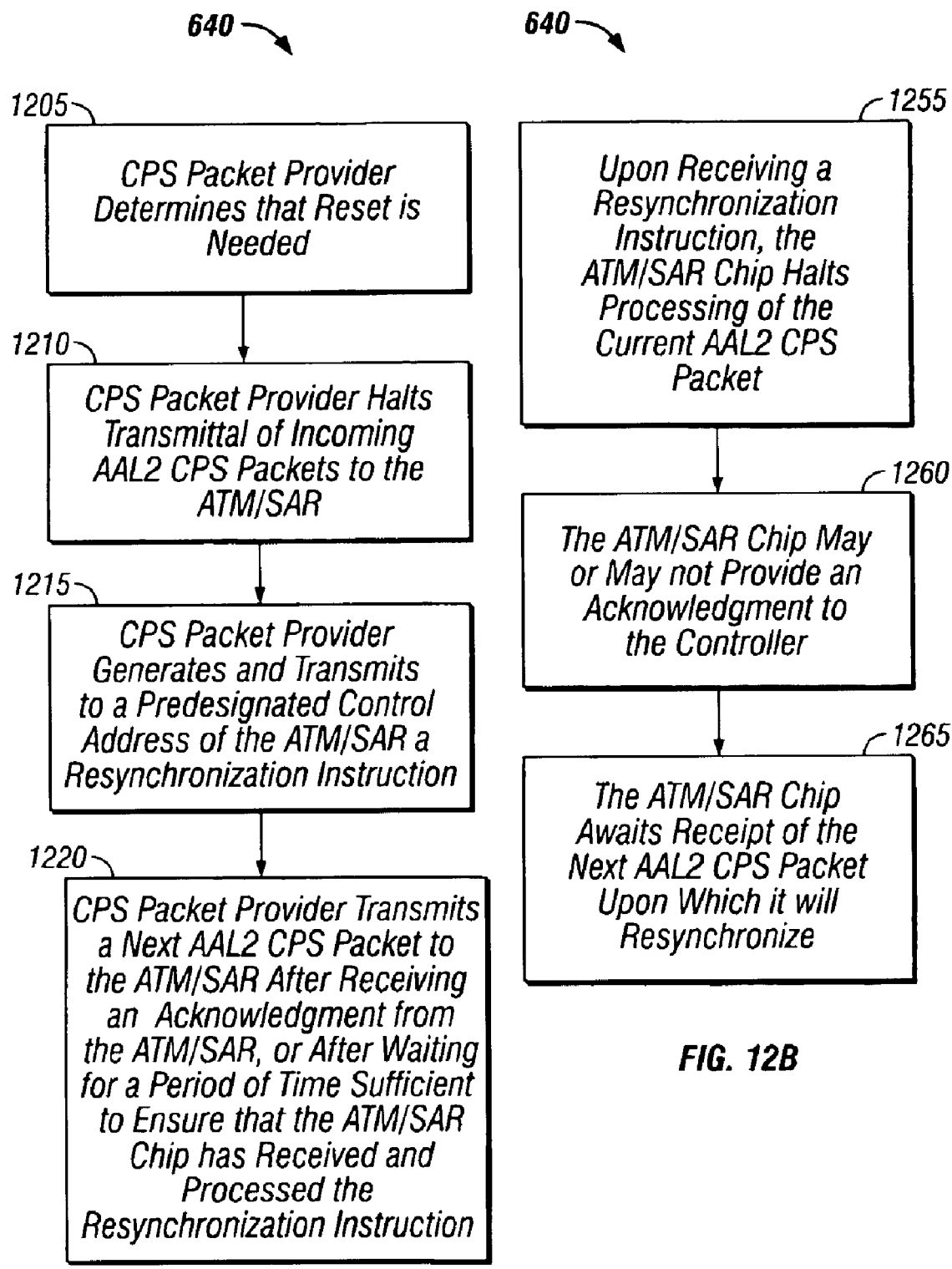

FIGS. 12A and 12B illustrate a method 640 to perform a soft-resynchronization of the ATM/SAR chip 364 by transmitting to the ATM/SAR chip 364 a resynchronize instruction. FIG. 12A illustrates operation of the CPS packet provider used to provide the resynchronize instruction, while FIG. 12B illustrates operation of the ATM/SAR chip 364.

As illustrated in FIG. 12A, the CPS packet provider may determine that resynchronization should be performed (step 1205), and may halt transmission of additional AAL2 CPS packets (step 1210). The CPS packet provider next may generate and transmit a resynchronization instruction to a predesignated control address of the ATM/SAR chip (step 1215). The CPS packet provider may wait for an acknowledgement from the SAR chip before sending another AAL2 CPS packet (step 1220). For example, rather than rely on an acknowledgement from the ATM/SAR chip, the CPS packet provider may simply wait a period of time adequate to allow the ATM/SAR chip to receive the resynchronization instruction and to operate as instructed by the resynchronization instruction (step 1220).

As illustrated in FIG. 12B, the ATM/SAR chip 364, upon receiving the resynchronization instruction, may halt processing of the current AAL2 CPS packet (step 1255). The ATM/SAR chip 364 may provide an acknowledgement to the controller that the synchronization instruction was received (step 1260). The ATM/SAR chip then may await receipt of the next data indicated by its address, for example, to be part of an AAL2 CPS packet (step 1265). The ATM/SAR chip may be configured to recognize that the first octets of this data include header information, and the ATM/SAR chip may use this header information to refresh the synchronization information, thus restoring the SAR to a state of synchronization.

These general and specific aspects may be implemented using a method, a system, or a computer program, or any combination of systems, methods, and computer programs.

Other implementations are within the scope of the following claims.

What is claimed is:

1. A method comprising:
   transmitting a variable length AAL CPS packet over a non-ATM-specific bus;
   receiving a first part of the variable length AAL CPS packet;
   determining a length of the variable length AAL CPS packet;
   determining synchronization information based on the length of the variable length AAL CPS packet;
   continuing to receive the variable length AAL CPS packet; and
   using the synchronization information to determine that reception of the variable length AAL CPS packet is complete.

2. The method of claim 1 in which the variable length AAL CPS packet comprises an AAL2 CPS packet and the non-ATM-specific bus comprises a PCI bus.

3. The method of claim 1 in which transmitting the variable length AAL CPS packet over a non-ATM-specific bus further comprises transmitting the variable length AAL CPS packet to a predetermined address associated with receipt of variable length AAL CPS packets.

4. The method of claim 1 in which receiving a first part of the variable length AAL CPS packet comprises receiving header information of the variable length AAL CPS packet and in which determining a length of the variable length AAL CPS packet comprises reading a value indicative of the length of the variable length AAL CPS packet from the header information of the variable length AAL CPS packet.

5. The method of claim 1 further comprising determining whether to save or discard the variable length AAL CPS packet.

6. The method of claim 5 in which determining whether to save or discard the variable length AAL CPS packet comprises determining whether there is currently sufficient buffer space to save the complete AAL CPS packet.

7. The method of claim 5 in which determining whether to save or discard the variable length AAL CPS packet comprises determining whether there is currently sufficient buffer space to save a received but unsaved portion of the AAL CPS packet.

8. The method of claim 1 further comprising determining whether resynchronization should occur and performing a soft-resynchronization if it is determined that resynchronization should occur.

9. The method of claim 8 in which determining whether resynchronization should occur includes receiving an indication that synchronization has been lost.

10. The method of claim 9 in which determining whether resynchronization should occur includes receiving an indication that a predetermined interval has passed since a prior resynchronization.

11. The method of claim 8 in which performing a soft-resynchronization comprises:
generating a number of null AAL CPS packets;
transmitting the null AAL CPS packets;
receiving the null AAL CPS packets; and
resynchronizing based on the received null AAL CPS packets.

12. The method of claim 11 in which a length of a maximally long AAL CPS packet is indicative of a number of octets comprising the maximally long AAL CPS packet, and in which an aggregated length of the null AAL CPS packets is at least equal to the length of the maximally long AAL CPS packet.

13. The method of claim 12 further comprising:
generating a second AAL2 CPS packet;
transmitting the second AAL2 CPS packet; and
receiving the second AAL2 CPS packet;
in which resynchronizing because of the received null AAL CPS packets includes entering a search mode because of the received null AAL CPS packets and searching received packets octet-by-octet for a first non-zero octet while in the search mode.

14. The method of claim 11 in which a length of a maximally long AAL CPS packet is indicative of a number of read-write cycles used to transmit the maximally long AAL CPS packet, and in which an aggregated length of the null AAL CPS packets is at least equal to the length of the maximally long AAL CPS packet.

15. The method of claim 14 in which resynchronizing because of the received null AAL CPS packets includes determining synchronization information from a received null AAL CPS packet.

16. The method of claim 8 in which performing a soft-resynchronization comprises:
generating a resynchronization instruction;
transmitting the resynchronization instruction over the non-ATM-specific bus;
receiving the resynchronization instruction; and
resynchronizing based on the resynchronization instruction.

17. A system comprising:
a transmitting circuit that transmits a variable length AAL CPS packet over a non-ATM-specific bus;
a first receiving circuit that receivesa first part of the variable length AAL CPS packet;
a length determining circuit that determines a length of the variable length AAL CPS packet;
a sync determination circuit that determines synchronization information based on the length of the variable length AAL CPS packet;
a second receiving circuit that continues to receive the variable length AAL CPS packet; and
a synchronization circuit that uses the synchronization information to determine that reception of the variable length AAL CPS packet is complete.

18. The system of claim 17 in which the first receiving circuit comprises a header reception circuit that receives header information of the variable length AAL CPS packet and in which the length determining circuit comprises a reading circuit that reads a value indicative of the length of the variable length AAL CPS packet from the header information of the variable length AAL CPS packet.

19. The system of claim 17 further comprising a discard circuit that determines whether to save or discard the variable length AAL CPS packet, and in which the discard circuit includes a buffer query circuit that determines whether there is currently sufficient buffer space to save a received but unsaved portion of the AAL CPS packet.

20. The system of claim 17 further comprising a sync control circuit that determines whether resynchronization should occur and that includes a resynchronization circuit that performs a soft-resynchronization if it is determined that resynchronization should occur.

21. The system of claim 20 in which the soft-resynchronization circuit comprises:
a null generation circuit that generates a number of null AAL CPS packets;
a null transmission circuit that transmits the null AAL CPS packets;
a null reception circuit that receives the null AAL CPS packets; and
a null resynchronization circuit that resynchronizes because of the received null AAL CPS packets.

22. The system of claim 21 in which a length of a maximally long AAL CPS packet is indicative of a number of octets comprising the maximally long AAL CPS packet, and in which an aggregated length of the null AAL CPS packets is at least equal to the length of the maximally long AAL CPS packet.

23. The system of claim 22 further comprising:
a packet generator circuit that generates a second AAL2 CPS packet;
a packet transmission circuit that transmits the second AAL2 CPS packet; and
a packet reception circuit that receives the second AAL2 CPS packet;

in which the null resynchronization circuit includes a searching circuit that enters a search mode because of the received null AAL CPS packets and searches received packets octet-by-octet for a first non-zero octet while in the search mode.

24. A computer program stored on a computer readable medium or a propagated signal, the computer program comprising:

a transmitting code segment that causes the computer to transmit a variable length AAL CPS packet over a non-ATM-specific bus;

a first receiving code segment that causes the computer to receive a first part of the variable length AAL CPS packet;

a length code segment that causes the computer to determine a length of the variable length AAL CPS packet;

a sync determination code segment that causes the computer to determine synchronization information based on the length of the variable length AAL CPS packet;

a second receiving code segment that causes the computer to continue to receive the variable length AAL CPS packet; and a synchronization code segment that causes the computer to use the synchronization information to determine that reception of the variable length AAL CPS packet is complete.

25. The computer program of claim 24 in which the first receiving code segment comprises a header reception code segment that causes the computer to receive header information of the variable length AAL CPS packet and in which the length code segment comprises a reading code segment that causes the computer to read a value indicative of the length of the variable length AAL CPS packet from the header information of the variable length AAL CPS packet.

26. The computer program of claim 24 further comprising a discard code segment that causes the computer to determine whether to save or discard the variable length AAL CPS packet, and in which the discard code segment includes a buffer query code segment that causes the computer to determine whether there is currently sufficient buffer space to save a received but unsaved portion of the AAL CPS packet.

27. The computer program of claim 24 further comprising a sync control code segment that causes the computer to determine whether resynchronization should occur, and that includes a resynchronization code segment that causes the computer to perform a soft-resynchronization if it is determined that resynchronization should occur.

28. The computer program of claim 27 in which the soft-resynchronization code segment comprises:

a null generation code segment that causes the computer to generate a number of null AAL CPS packets;

a null transmission code segment that causes the computer to transmit the null AAL CPS packets;

a null reception code segment that causes the computer to receive the null AAL CPS packets; and a null resynchronization code segment that causes the computer to resynchronize because of the received null AAL CPS packets.

29. The computer program of claim 28 in which a length of a maximally long AAL CPS packet is indicative of a number of octets comprising the maximally long AAL CPS packet, and in which an aggregated length of the null AAL CPS packets is at least equal to the length of the maximally long AAL CPS packet.

30. The computer program of claim 29 further comprising:

a packet generator code segment that causes the computer to generate a second AAL2 CPS packet;

a packet transmission code segment that causes the computer to transmit the second AAL2 CPS packet; and a packet reception code segment that causes the computer to receive the second AAL2 CPS packet;

in which the null resynchronization code segment includes a searching code segment that causes the computer to enter a search mode because of the received null AAL CPS packets and while in the search mode to search received packets octet-by-octet for a first non-zero octet.

* * * * *